(12) United States Patent
Ko et al.

(10) Patent No.: US 10,866,583 B2
(45) Date of Patent: Dec. 15, 2020

(54) DUAL CONTROLLER SYSTEM

(71) Applicant: HYOSUNG HEAVY INDUSTRIES CORPORATION, Seoul (KR)

(72) Inventors: Chul-Jin Ko, Namyangju-si (KR); Jun-Chol Lee, Gunpo-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 15/538,863

(22) PCT Filed: Dec. 30, 2015

(86) PCT No.: PCT/KR2015/014495
§ 371 (c)(1),
(2) Date: Jun. 22, 2017

(87) PCT Pub. No.: WO2016/108627
PCT Pub. Date: Jul. 7, 2016

(65) Prior Publication Data
US 2018/0011482 A1 Jan. 11, 2018

(30) Foreign Application Priority Data
Dec. 31, 2014 (KR) .................. 10-2014-0195580

(51) Int. Cl.
*G05B 23/02* (2006.01)
*H02J 13/00* (2006.01)
(Continued)

(52) U.S. Cl.
CPC .......... *G05B 23/0286* (2013.01); *G05B 9/03* (2013.01); *G05B 23/0267* (2013.01); *H02J 3/00* (2013.01);
(Continued)

(58) Field of Classification Search
CPC .. G05B 23/0286; G05B 23/0267; G05B 9/03; H02J 3/00; H02J 13/0003
(Continued)

(56) References Cited

U.S. PATENT DOCUMENTS 4,355,310 A * 10/1982 Belaigues ............ G01V 11/002
340/10.1
5,867,501 A * 2/1999 Horst ............... G01R 31/31727
370/474
(Continued)

FOREIGN PATENT DOCUMENTS

JP 2014-098949 A 5/2014
KR 10-0412301 B1 12/2003
(Continued)

OTHER PUBLICATIONS

Nasa, "Computer synchronization and redundancy management", Jun. 22, 2011, pp. 1-6 downloaded from the internet at https://web.archive.org/web/20110622055846/http://history.nasa.gov/computers/Ch4-4.html (Year: 2011).*
(Continued)

*Primary Examiner* — Rocio Del Mar Perez-Velez
*Assistant Examiner* — Olvin Lopez Alvarez
(74) *Attorney, Agent, or Firm* — Novick, Kim & Lee, PLLC; Jae Youn Kim (57) ABSTRACT

The present invention relates to a dual controller system for analyzing a control signal received from two dual controllers, both of which operate in an active state, to check whether an error occurs in the controllers and to perform operation with a controller in a normal state. A dual controller system according to the present invention includes a plurality of lower-layer modules performing respective functions, and first and second controllers for controlling each of the plurality of lower-layer modules, wherein the
(Continued)

first and second controllers transmit control signals to the plurality of lower-layer modules, and the lower-layer modules determine whether an error occurs in the two received control signals, remove an erroneous control signal and perform a function according to a normal control signal.

3 Claims, 6 Drawing Sheets

(51) Int. Cl.
  *H02J 3/00* (2006.01)
  *G05B 9/03* (2006.01)
(52) U.S. Cl.
  CPC .............. *H02J 13/0003* (2013.01); *G05B 2219/24178* (2013.01); *G05B 2219/31026* (2013.01); *G05B 2219/34487* (2013.01); *Y02E 60/00* (2013.01); *Y04S 10/30* (2013.01)
(58) Field of Classification Search
  USPC ........................................ 700/293
  See application file for complete search history.

(56) References Cited

U.S. PATENT DOCUMENTS

| | | | | |
|---|---|---|---|---|
| 5,975,738 | A * | 11/1999 | DeKoning | G06F 11/2089 700/79 |
| 6,742,136 | B2 * | 5/2004 | Christensen | G06F 11/2005 714/5.11 |
| 7,424,642 | B2 * | 9/2008 | Howell | G05B 9/03 318/564 |
| 7,483,778 | B2 * | 1/2009 | Armbruster | G05B 9/03 701/31.4 |
| 7,680,034 | B2 * | 3/2010 | King | G05B 9/03 370/228 |
| 8,539,307 | B1 * | 9/2013 | Ramey | G10L 19/005 714/758 |
| 2003/0105537 | A1 * | 6/2003 | Crispin | B60W 10/04 700/20 |
| 2003/0212473 | A1 * | 11/2003 | Vandevanter | G06F 1/12 700/293 |
| 2003/0212835 | A1 * | 11/2003 | Berkcan | G06F 1/12 713/375 |
| 2004/0195460 | A1 * | 10/2004 | Sailer | G05B 9/03 244/194 |
| 2005/0232145 | A1 * | 10/2005 | Tanju | G05B 9/03 370/217 |
| 2007/0002506 | A1 * | 1/2007 | Papallo | H02H 7/30 361/38 |
| 2007/0168058 | A1 * | 7/2007 | Kephart | G05B 9/03 700/82 |
| 2007/0168705 | A1 * | 7/2007 | Dohi | G06F 11/008 714/6.11 |
| 2007/0174686 | A1 * | 7/2007 | Douglas | G06F 11/2097 714/13 |
| 2010/0060017 | A1 * | 3/2010 | Oda | H02H 7/261 290/40 R |
| 2011/0135047 | A1 * | 6/2011 | Tournier | G05B 19/0421 375/356 |
| 2011/0246818 | A1 * | 10/2011 | Takada | G06F 11/0727 714/6.2 |
| 2012/0134184 | A1 * | 5/2012 | Park | H02M 7/49 363/37 |
| 2012/0210199 | A1 * | 8/2012 | Gale | G06F 11/1633 714/807 |
| 2013/0204405 | A1 * | 8/2013 | Kiuchi | G06F 11/185 700/79 |
| 2013/0262939 | A1 * | 10/2013 | Saito | G06F 11/30 714/49 |
| 2013/0274901 | A1 | 10/2013 | Chouinard | |
| 2014/0257639 | A1 * | 9/2014 | Chandy | B62D 5/0493 701/41 |
| 2014/0301384 | A1 * | 10/2014 | Fletcher | H04B 7/18506 370/350 |
| 2014/0314069 | A1 * | 10/2014 | Park | H04W 56/002 370/350 |
| 2015/0229229 | A1 * | 8/2015 | Hafner | H02M 7/537 363/123 |
| 2017/0006551 | A1 * | 1/2017 | Zhu | H04W 52/12 |
| 2017/0351249 | A1 * | 12/2017 | Oh | G05B 19/02 |
| 2017/0371310 | A1 * | 12/2017 | Kang | H02J 1/00 |

FOREIGN PATENT DOCUMENTS

| | | | |
|---|---|---|---|
| KR | 10-2008-0020807 A | 3/2008 | |
| KR | 10-0964070 B1 | 6/2010 | |
| KR | 100964070 * | 6/2010 | ............ H02P 27/06 |
| KR | 10-2012-0020867 A | 3/2012 | |
| KR | 2013-0101756 A | 9/2013 | |
| KR | 2014-0086652 A | 7/2014 | |
| KR | 20140086652 A * | 7/2014 | ............... H02J 3/36 |

OTHER PUBLICATIONS

Hanway et al "Space Shuttle Avionics System Original Contains", 1989, pp. 72, downloaded from the internet at https://ntrs.nasa.gov/archive/nasa/casi.ntrs.nasa.gov/19900015844.pdf (Year: 1989).*

* cited by examiner

DUAL CONTROLLER SYSTEM

TECHNICAL FIELD

The present invention generally relates to a dual controller system and, more particularly, to a dual controller system for analyzing, by a plurality of lower-layer modules, a control signal received from two dual controllers, which operate in an active state, to check whether an error occurs in the controllers and to perform operation with a controller in a normal state.

BACKGROUND ART

Nowadays, power grid-connected systems are being continuously developed. Such a grid-connected system includes not only an inverter but also a High-Voltage Direct Current (HVDC) system, a Static Synchronous Compensator (STATCOM) system, a Power Conditioning System (PCS), or the like.

Typically, an HVDC system or a STATCOM using a modular multilevel converter (MMC) uses a dual controller in order to improve the stability of system operation. The dual controller is advantageous in that even when one controller is faulty or in a maintenance mode, the other controller may operate a system and accordingly, the system may stably operate without interruption.

However, in a typical dual controller system, when a main controller operates, a sub-controller is required in order to constantly monitor whether a fault occurs in the main controller. To this end, a module for monitoring a state is typically required to be installed between a main controller and a sub-controller. For example, Korean Patent Laid-open Publication No. 10-2012-0020867 discloses a shared memory for sharing control signal data, separately installed between a main controller and a sub-controller.

In order to address this requirement, recently, for example, Korean Patent No. 10-0964070 discloses a technique for determining whether a fault occurs in a main controller using a control signal of the main controller. In Korean Patent No. 10-0964070, after the main controller transmits communication data to a plurality of drivers, a sub-controller counts the elapsed time when the main controller re-transmits communication data to the plurality of drivers and determines that a fault occurs in the main controller when the counted elapsed time is equal to or longer than a preset time.

However, since the determination of the occurrence of a fault takes some time, it is difficult to apply this prior art to a system which requires high-speed data processing, such as an HVDC or STATCOM system. In addition, in the above-described prior art, a main controller operates in an active state and a sub-controller remains in the standby state and then operates when a fault occurs in the main controller. Accordingly, it is difficult to apply the prior art to a dual system in which both of two controllers operate in active states.

DISCLOSURE

Technical Problem

Accordingly, the present invention has been made keeping in mind the above problems occurring in the prior art, and an object of the present invention is to provide a dual controller system for analyzing, by a lower-layer module, a control signal received from two dual controllers, which operate in an active state, to check whether an error occurs in the controllers and to allow a controller in a normal state to operate.

Another object of the present invention is to provide a dual controller system capable of rapidly processing a signal in one controller when failure occurs in the other controller in a dual controller.

Technical Solution

In order to accomplish the above objects, the present invention provides a dual controller system including: a plurality of lower-layer modules performing respective functions; and first and second controllers for controlling each of the plurality of lower-layer modules, wherein the first and second controllers transmit control signals to the plurality of lower-layer modules, and the lower-layer modules determine whether an error occurs in the two received control signals, remove an erroneous control signal and perform a function according to a normal control signal.

The dual controller system may further include a clock-generating unit for generating a clock according to a preset period, wherein the first and second controllers transmit control signals to the lower-layer modules according to the clock generated by the clock-generating unit.

The first and second controllers may transmit the control signals simultaneously or at a prescribed interval in the same clock period.

The plurality of lower-layer modules may feed back a message indicating that there is an erroneous signal and that the controller that transmitted the erroneous control signal is not allowed to transmit a control signal from the next clock period.

The controller in the normal state may verify whether an error occurs through communication with the controller in the abnormal state, and when it is verified that an error has occurred, may prevent power from being supplied to the controller in the abnormal state.

In determining whether the error occurs, the error may be determined to occur when the control signal deviates from a range defined by preset minimum and maximum values.

In order to accomplish the above objects, the present invention provides a dual controller system including: a plurality of lower-layer modules performing respective functions; first and second controllers for controlling each of the plurality of lower-layer modules; and a relay unit for relaying and blocking information between the first and second controllers and the plurality of lower-layer modules, wherein the relay unit receives control signals from the first and second controllers and delivers the received control signals to the lower-layer modules, the lower-layer modules determine whether an error occurs in the two received control signals, remove an erroneous control signal, perform a function according to a normal control signal, and transmit, to the relay unit, a message indicating that an error occurs in the control signal, and the relay unit blocks the relay of information about the controller that transmitted the erroneous control signal.

The dual controller system may further include a clock-generating unit for generating a clock according to a preset period, wherein the first and second controllers transmit control signals to the lower-layer modules according to the clock generated by the clock-generating unit.

The first and second controllers may transmit the control signals simultaneously or at a prescribed interval in the same clock period.

The controller in the normal state may re-check whether an error occurs through communication with the controller in the abnormal state, and when it is verified that an error has occurred, may prevent power from being supplied to the controller in the abnormal state.

When, among the plurality of lower-layer modules, the number of lower-layer modules that have transmitted the message indicating that the error occurs in the control signal is equal to or greater than a preset reference value, the relay unit may block the relay of information about a controller that transmitted the erroneous control signal.

Advantageous Effects

Unlike the prior art, in which a main controller operates in an active state and a sub-controller remains in a standby state and then is switched over to an active state and operates when failure occurs in the main controller, according to the present invention, since two controllers operate in active states, when a fault occurs in either controller, a signal may be rapidly processed without a switchover process.

In addition, according to the present invention, since a plurality of lower-layer modules, which receive a control signal and operate, determine whether an error occurs in the two controllers, no separate equipment is necessary in order to determine whether an error occurs in the controllers.

BEST MODE

Hereinafter, embodiments of the present invention will be described in detail with reference to the accompanying drawings. Initially, it should be noted that like reference numerals refer to like constituent elements even when they are illustrated in different drawings. Further, in the description of the present invention, when it is determined that the detailed description of related functions and constructions would obscure the gist of the present invention, such description will be omitted.

In addition, in describing elements of embodiments of the present invention, terms such as "first", "second", "A", "B", "(a)", and "(b)" may be used. Such terms are used only for distinguishing an element from another element, but do not limit the substance of the element or the sequence or order thereof. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
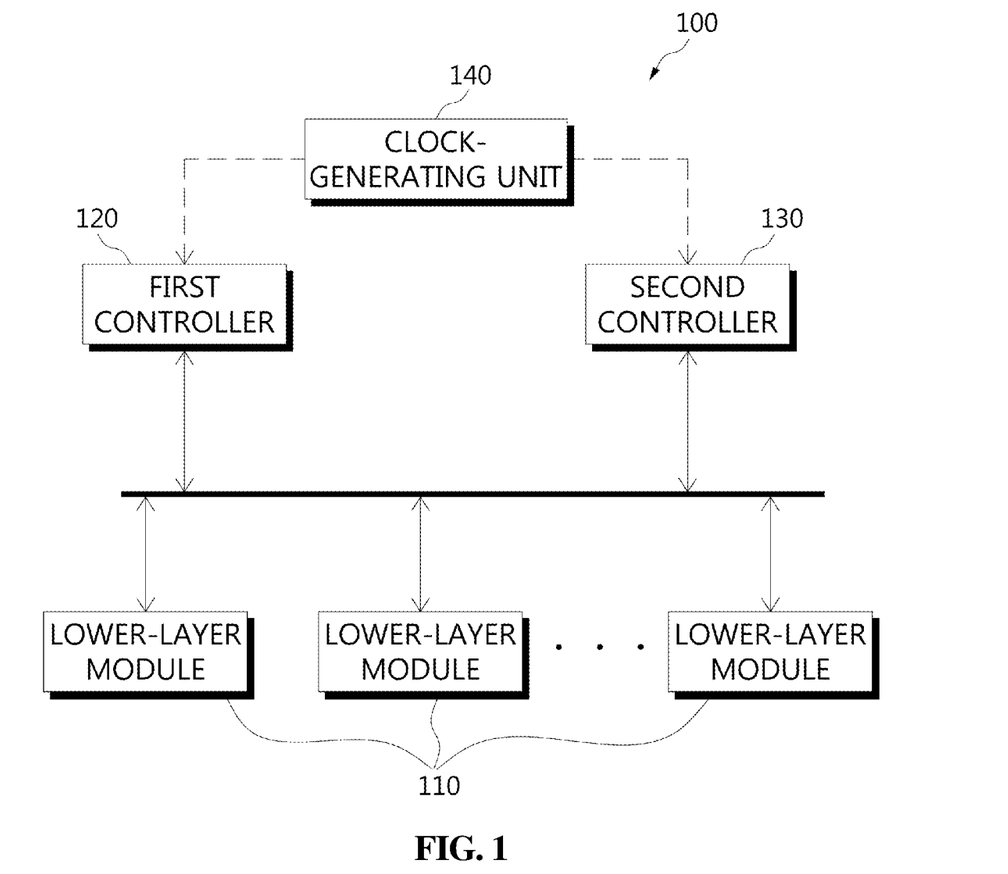
FIG. 1 is a configuration diagram of a dual controller system according to an embodiment of the present invention.

FIG. 1 is a configuration diagram of a dual controller system according to an embodiment of the present invention.

Referring to FIG. 1, a dual controller system 100 according to an embodiment of the present invention includes a plurality of lower-layer modules 110 and first and second controllers 120 and 130 on an upper layer.

The plurality of lower-layer modules 110 and the first and second controllers 120 and 130 on the upper layer communicate with each other. The first and second controllers 120 and 130 of the upper layer control the plurality of lower-layer modules 110 and the plurality of lower-layer modules 110 respectively perform preset functions according to the controls. For example, in an HVDC system, the lower-layer modules 110 may be a plurality of sub-modules, and the first and second controllers 120 and 130 may be sub-module controllers.

The first controller 120 and the second controller 130 are dualized to perform the same function. In particular, in the present embodiment, both of the controllers 120 and 130 operate in active states. In other words, in the prior art, one controller is in an active state and the other operates in a standby state. While the controller in the active state operates, the controller in the standby state stands by, switching over to participate in operation when a fault occurs in the controller in the active state. Unlike the related art, in the present embodiment the two controllers 120 and 130 simultaneously operate in the active state.

The first and second controllers 120 and 130 transmit control signals, for controlling the plurality of lower-layer modules 110, to each of the plurality of lower-layer modules 110. Then each of the plurality of lower-layer modules 110 respectively performs corresponding functions according to the control signals. Here, the first and second controllers 120 and 130 transmit identical control signals. However, which controllers transmit the control signals may be identified. For example, which controllers transmit each of the two identical signals may be identified by including identification information about the first and second controllers 120 and 130 in each control signal.

At this point, each lower-layer module 110 inspects the two control signals received from the first and second controllers 120 and 130 to check whether an error occurs in the control signals. Such control signal inspection may be performed in various manners. For example, it may be set to determine whether the data included in the control signal is within or out of a preset reference range. When an error occurs in any one of the two control signals, which are respectively received from the first and second controllers 120 and 130, a message indicating that an error occurs in the control signal is transmitted to the first and second controllers 120 and 130.

Accordingly, each of the first and second controllers 120 and 130 checks whether an error occurred in the control signal, which was transmitted by itself, from the messages received from the plurality of lower-layer modules 110, and does not transmit a control signal any more, when the error occurred in the control signal that was transmitted by itself. To this end, for example, the supply of power to an abnormal controller may be blocked. A normal controller, in which an error does not occur, continuously transmits a control signal to the lower-layer modules 110.

On the other hand, the dual controller system 100 according to an embodiment of the present invention may further include a clock-generating unit 140 for generating a clock according to a preset period. In this case, the first and second controllers 120 and 130 transmit control signals to the lower-layer modules 110 according to the clock generated by the clock-generating unit 140. This is for transmitting, by the two controllers 120 and 130, the control signals at the same time. Accordingly, the control signals, received at the same time by the lower-layer modules 110, are compared and checked. When the control signals are not transmitted at the same time, control signals different from each other are compared. Accordingly, which control signals are to be compared is not clear, and duplexing is disabled. However, in reality, it is not easy for the two controllers 120 and 130 to respectively and accurately transmit control signals at the same time due to elements forming a system or electrical noise. Accordingly, in the present embodiment, the controls signals may be transmitted simultaneously or at a constant interval in the same period. Accordingly, each lower-layer module 110 may compare two control signals received within a preset clock period to determine whether an error occurs between the two.

In the present embodiment, before a control signal is stopped from being transmitted any more by the erroneous controller, the normal controller communicates with the erroneous controller to verify that the abnormality has occurred and may prevent power from being supplied to the erroneous controller, when it is verified that an abnormality has occurred.

Figure 2:
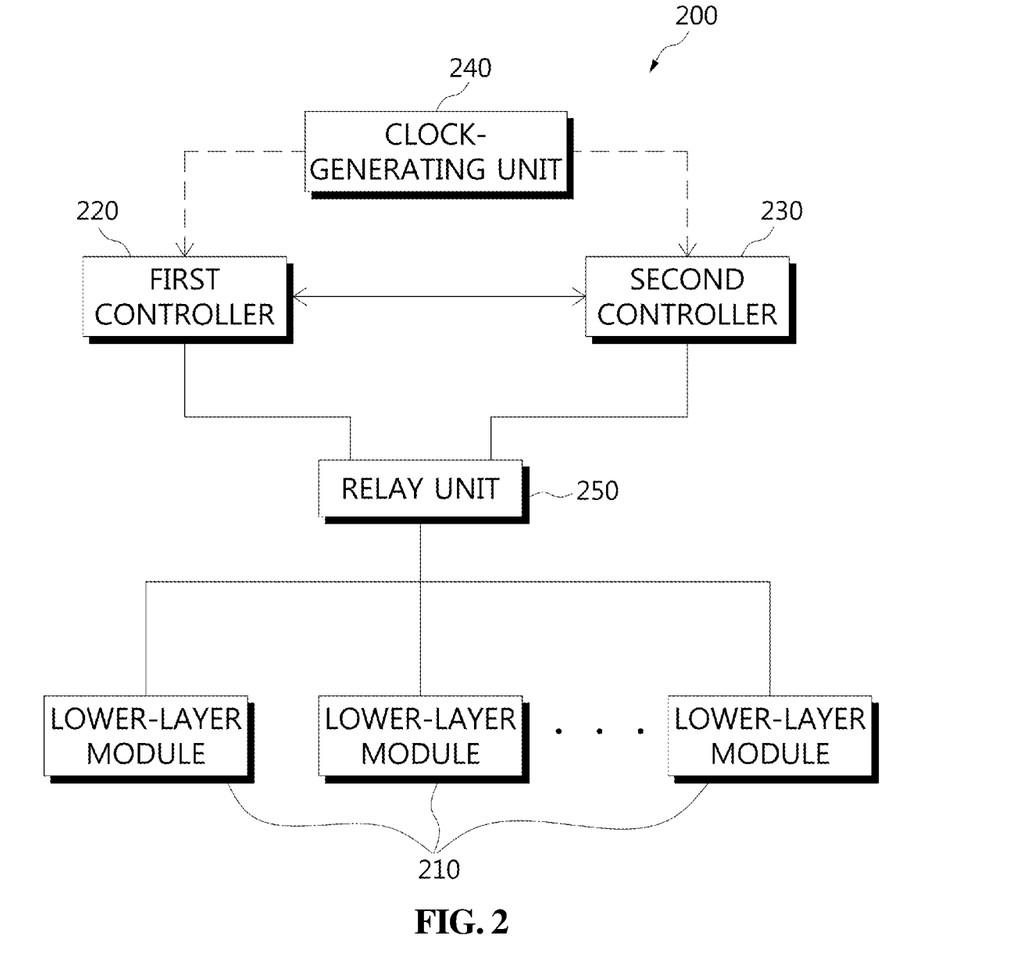
FIG. 2 is a configuration diagram of a dual controller system according to another embodiment of the present invention.

FIG. 2 is a configuration diagram of a dual controller system according to another embodiment of the present invention.

Referring to FIG. 2, a dual controller system 200 according to another embodiment of the present invention further includes a relay unit 250, in addition to the dual controller system 100 illustrated in FIG. 1. In other words, the lower-layer modules 110, the first controller 120, the second controller 130, and the clock-generating unit 140 illustrated in FIG. 1 respectively correspond to the lower-layer modules 210, the first controller 220, the second controller 230, and the clock-generating unit 240. However, there are differences in some functions. Hereinafter the differences will be described in detail.

The dual controller system 200 according to the other embodiment includes the plurality of lower-layer modules 210, the first and second controllers 220 and 230 of the upper layer, and the relay unit 250. The relay unit 250 relays information among the first and second controllers 220 and 230 of the upper layer and the lower-layer modules 210 or blocks the relay thereof. In the present embodiment, such a dual controller system 200 may optionally further include the clock-generating unit 240.

In the present embodiment, the two controllers 220 and 230 both operate in an active state and respectively transmit the same control signal, for controlling the plurality of lower-layer modules 110, to the relay unit 250. The relay unit 250 delivers the control signals received from the first and second controllers 220 and 230 to the plurality of lower-layer modules 210. At this point, each of the lower-layer modules 110 compares the two control signals received from the relay unit 250 to check whether an error occurs in the control signals. When an error occurs in even one of the two control signals received from the relay unit 250, each of the lower-layer modules 210 transmits, to the relay unit 250, a message indicating the occurrence of the error in the control signal.

Then, the relay unit 250 checks, from the messages received from the plurality of lower-layer modules 110, which controller's control signal the error occurred in, and blocks the relay of the control signal received from the controller that transmitted the erroneous control signal (i.e. the abnormal controller). Accordingly, the control signal that was transmitted from the abnormal controller is not transmitted to the lower-layer modules 210 any more. To this end, for example, the supply of power to the abnormal controller may be blocked. The relay unit 250 continuously delivers a control signal, which has been transmitted from the normal controller and in which the error does not occur, to the lower-layer modules 110. Here, a process for checking, by the relay unit 250, which controller's control signal the error occurred in may be checked, for example, from messages transmitted by the plurality of lower-layer modules 110 and including information about which controller's control signal the error occurred in. In addition, in another example, when the number of lower-layer modules that have transmitted the message indicating the occurrence of the error in the control signal is equal to or greater than a preset reference value, it may be concluded that an error occurs in the controller corresponding to the control signal in which the error occurred. For example, when 8 of 10 lower-layer modules 110 receive a message that an error has occurred in a control signal transmitted from the second controller, it may be determined that the error occurred in the second controller.

On the other hand, in the case in which the dual controller system 200 optionally further includes the clock-generating unit 240, the first and second controllers 220 and 230 transmit control signals to the relay unit 250 according to a clock generated by the clock-generating unit 240. Similarly to FIG. 1, this serves to ensure that the two controllers 120 and 130 transmit control signals at the same time. The control signals may be transmitted simultaneously or at a constant interval in the same period. Accordingly, each lower-layer module 110 may compare two control signals received within a preset clock period to determine whether an error occurs in one of the two.

In the present embodiment, before a control signal is prevented from being transmitted any further by the erroneous controller, the normal controller communicates with the erroneous controller to verify that an abnormality has occurred, and may prevent power from being supplied to the erroneous controller when it is verified that an error has occurred.

Figure 3:
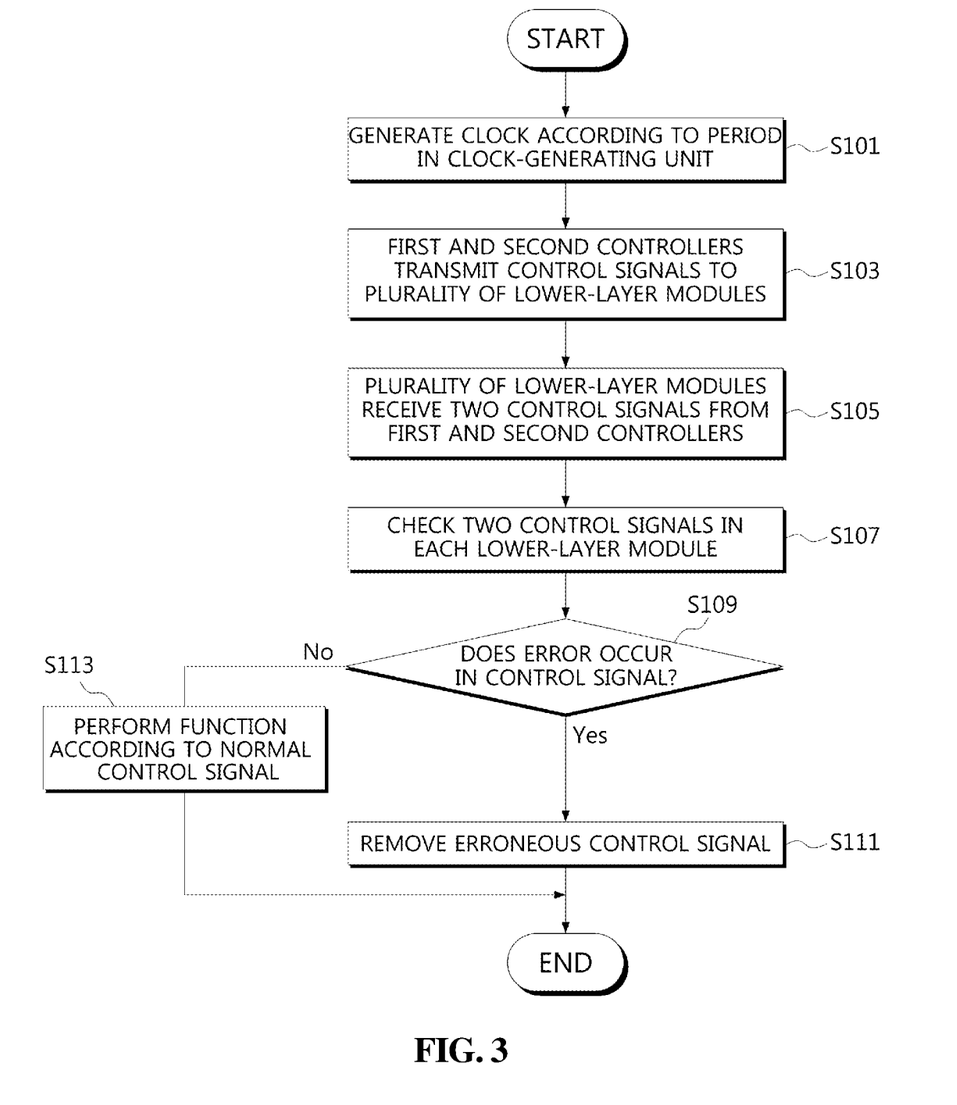
FIG. 3 is a flowchart illustrating the operation of a dual controller system according to an embodiment of the present invention.

FIG. 3 is a flowchart illustrating the operation of a dual controller system according to an embodiment of the present invention.

Referring to FIG. 3, in the present embodiment, the clock-generating unit 140 generates a clock in a preset period (step S101). The first and second controllers 120 and 130, operating in an active state, transmit control signals simultaneously or in the same clock period to the plurality of lower-layer modules 110 (step S103). When the clock-generating unit 140 is not optionally provided, the first and second controllers 120 and 130 may be set to transmit control signals at a preset period. Then, the plurality of lower-layer modules 110 receive the two control signals, transmitted from the first and second controllers 120 and 130 (step S105), and check the two received control signals (step S107). In the checking process, when an error is determined to have occurred (step S109), the control signal with the error occurred therein is removed (step S111) and a function is performed according to the normal control signal (step S113). In the determination of whether the error occurred at step S109, there are cases where both control signals have errors, one of the two has an error, or both are normal. When errors occur in both control signals, the two control signals are removed (step 111). When an error occurs in one of the two, the control signal in which the error occurred is removed (step S111) and the normal control signal performs a corresponding function (step S113). When both are normal control signals, since the two signals are the same control signal, a function according to the control signal is performed (step S113).

Figure 4:
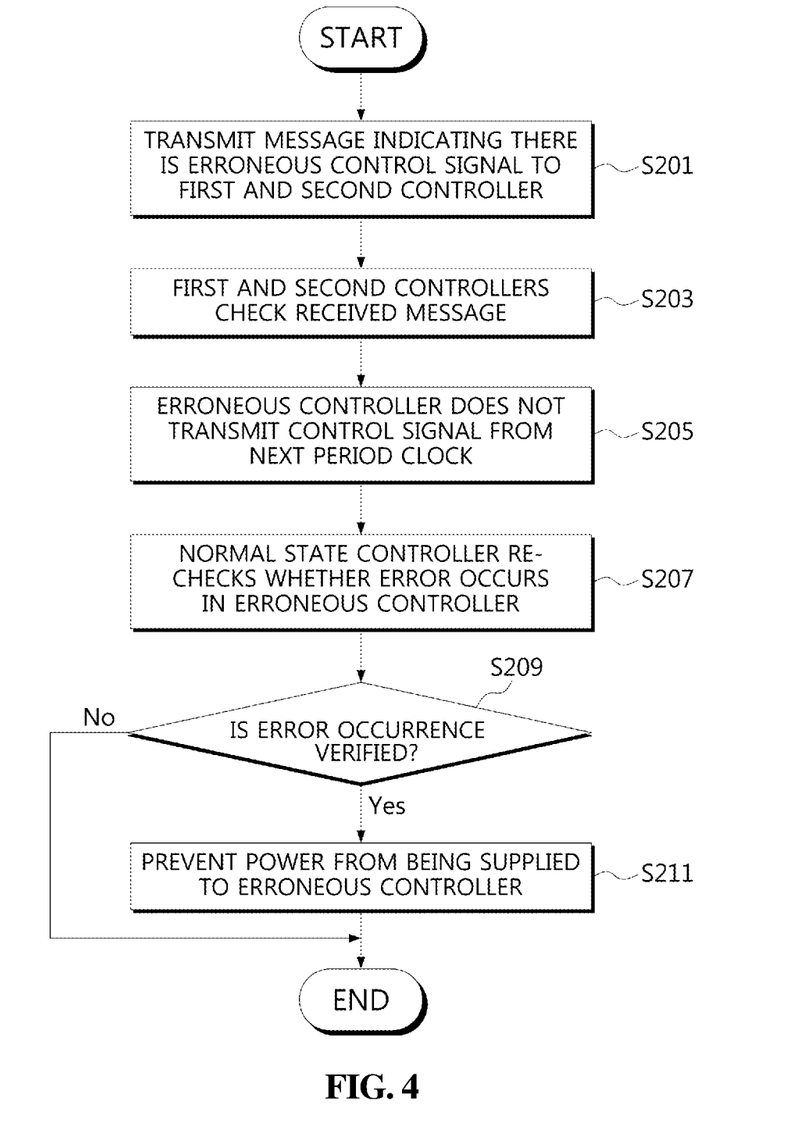
FIG. 4 is a flowchart illustrating a processing procedure of an abnormal controller in a dual controller system according to an embodiment of the present invention.

FIG. 4 is a flowchart illustrating a processing procedure of an abnormal controller in a dual controller system according to an embodiment of the present invention.

Referring to FIG. 4, in the present embodiment, when there is an erroneous control signal, a plurality of lower-layer modules 110 transmit, to the first and second controllers 120 and 130, messages indicating that there is an erroneous control signal. The first and second controllers 120 and 130 check the messages received from the plurality of lower-layer modules 110 (step S203), and the erroneous controller does not transmit a control signal from the next clock period (step S205). Then, the controller in the normal state verifies that an error has occurred through communication with a controller in an abnormal state (step S207), and when the occurrence of the error is verified (step S209), the supply of power to the abnormal controller is blocked (step S211).

Figure 5:
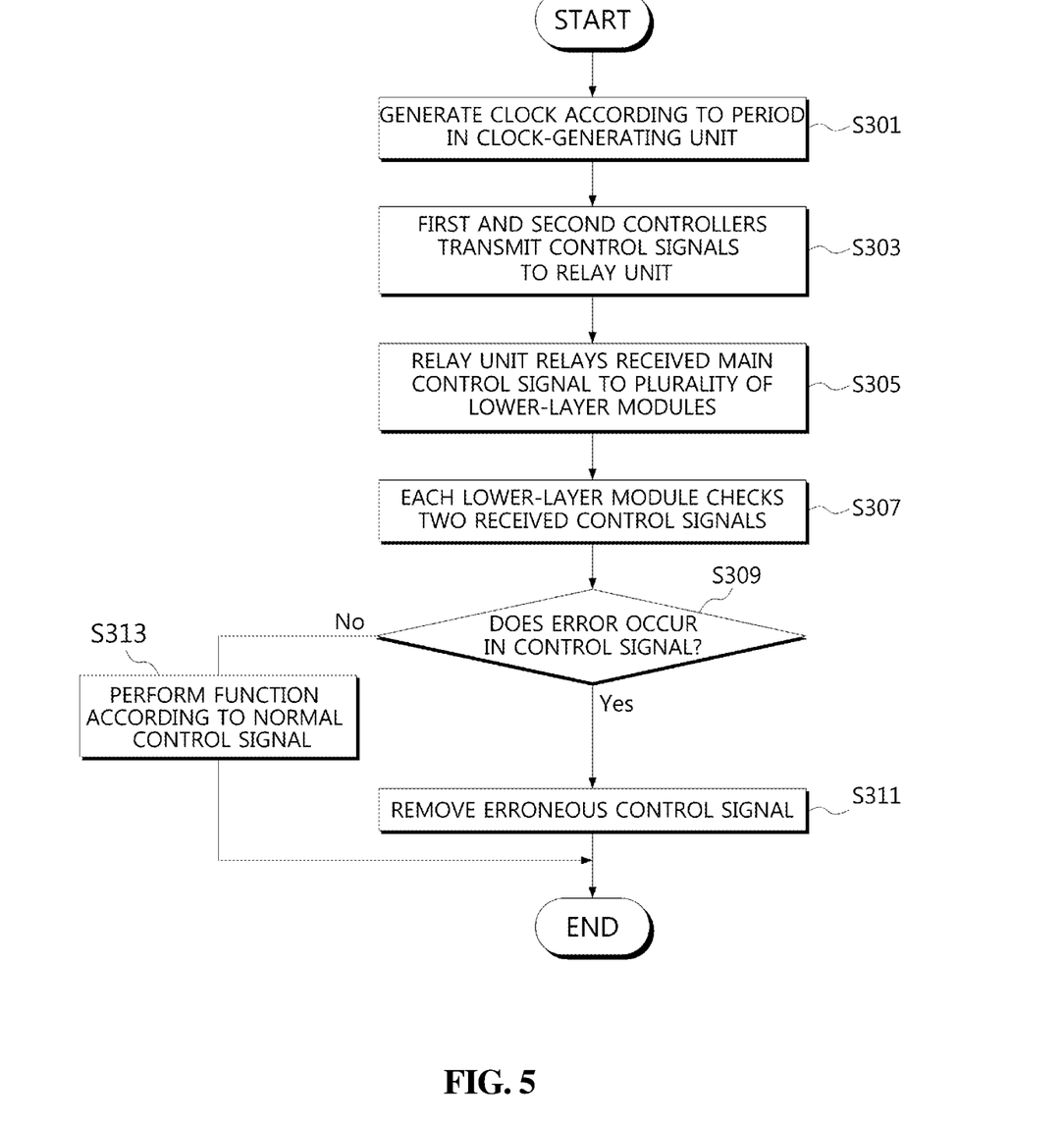
FIG. 5 is a flowchart illustrating an operating procedure of a dual controller system according to another embodiment of the present invention.

FIG. 5 is a flowchart illustrating an operation procedure of a dual controller system according to another embodiment of the present invention.

Referring to FIG. 5, in the present embodiment, the clock-generating unit 240 generates a clock in a preset period (step S301). The first and second controllers 120 and 130, operating in an active state, transmit control signals simultaneously or in the same clock period to the relay unit 250 (step S303). When the clock-generating unit 240, which is optional, is not provided, the first and second controllers 220 and 230 may be set to transmit control signals at a preset period to the relay unit 250. Then, the relay unit 250 relays the two control signals, received from the first and second controllers 220 and 230, to the plurality of lower-layer modules 210 (step S305). Each of the plurality of lower-layer modules 210 checks the two control signals received from the relay unit 250 (step S307). In the checking process, when it is determined that an error has occurred (step S309), the erroneous control signal is removed (step S311) and a function according to the normal control signal is performed (step S313). Here, in the determination of whether the error has occurred at step S309, there are cases where errors occur in both control signals, an error occurs in one of the two, or both are normal. When errors occur in both control signals, the two control signals are removed (step S311). When an error occurs in one of the two, the control signal in which the error occurred is removed (step S311) and the normal control signal performs a corresponding function (step S313). When both are normal control signals, since the two signals are the same control signal, a function according to the control signal is performed (step S313).

Figure 6:
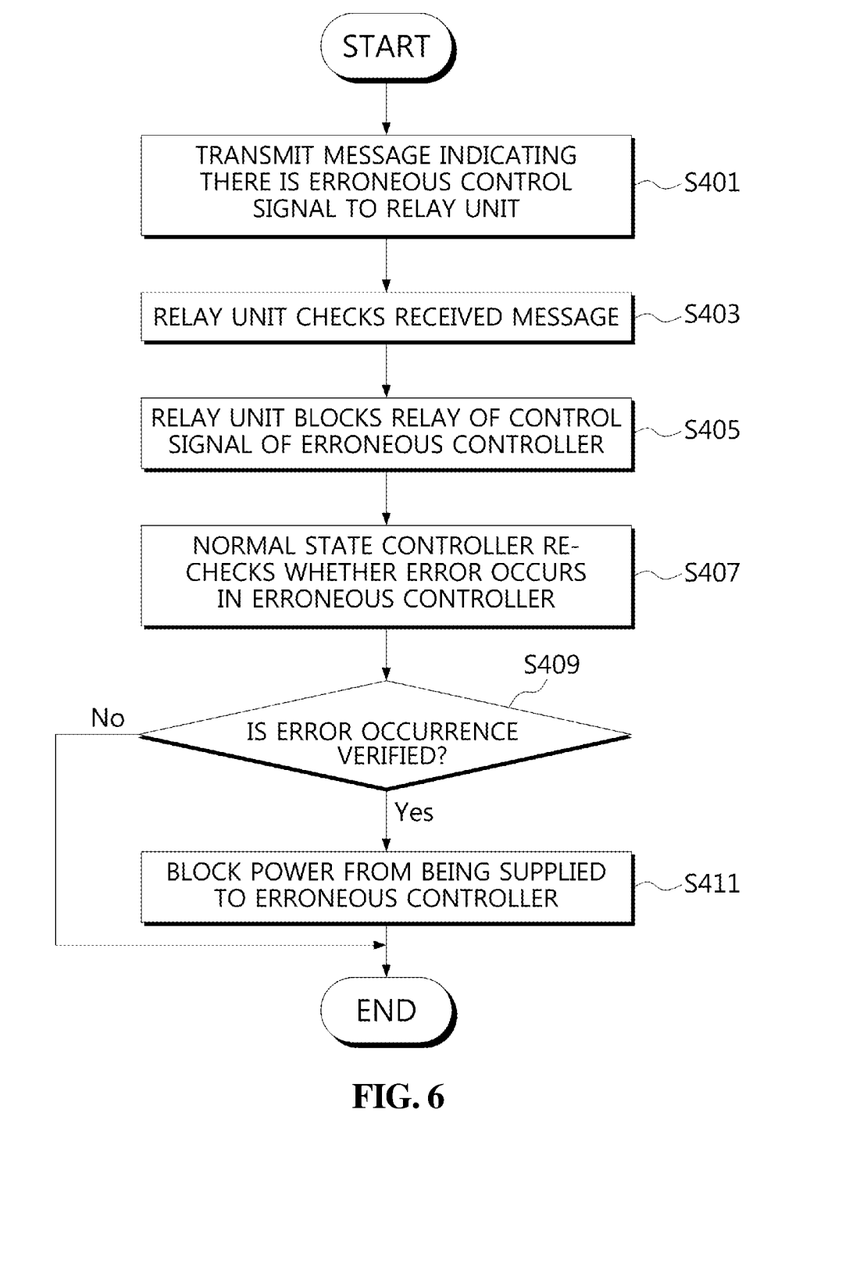
FIG. 6 is a flowchart illustrating a processing procedure of an abnormal controller in a dual controller system according to another embodiment of the present invention.

FIG. 6 is a flowchart illustrating a processing procedure of an abnormal controller in a dual controller system according to another embodiment of the present invention.

Referring to FIG. 6, in the present embodiment, when there is an erroneous control signal, a plurality of lower-layer modules 110 transmit, to the relay unit 250, messages indicating that there is an erroneous control signal (step S401). The relay unit 250 checks the messages received from the plurality of lower-layer modules 110 (step S403) and prevents the control signal that was transmitted from the erroneous controller from being transmitted to the plurality of lower-layer modules 210 from the next clock period (step S405). Then, the controller in the normal state verifies that an error occurred through communication with the controller in the abnormal state (step S407), and when the occurrence of the error is verified (step S409), the supply of power to the abnormal controller is blocked (step S411).

As described above, in the dual controller system according to the present invention, each of two dual controllers operating in an active state simultaneously transmits a control signal to a plurality of lower-layer modules. Each of the plurality of lower-layer modules checks two control signals and prevents an erroneous controller from transmitting the control signal any further. In addition, in the dual controller system according to the present invention, a relay unit relays information between the two dual controllers and a plurality of lower-layer modules and relays control signals from the two controllers to the plurality of lower-layer modules. Each of the lower-layer modules checks the two control signals and allows the relay unit to block a control signal of an erroneous controller such that the control signal of the erroneous controller is not transmitted any more. In this way, in the present invention, even if an error occurs in one of the two controllers, the normal controller is allowed to continue to control the lower-layer modules.

All the constructional elements of the embodiments of the present invention have been described as operating as though they are integrated as one element; however, the present invention is not limited to such embodiments. In other words, within the ranges of the objects of the present invention, at least two elements among the above mentioned constructional elements may be selectively integrated and operated. In addition, terms like 'include', 'comprise', and 'have' should be interpreted by default as inclusive rather than exclusive unless expressly defined to the contrary. Unless otherwise defined, all terms including technical and scientific terms used herein have the same meaning as commonly understood by one of ordinary skill in the art to which this invention belongs. Common terms as found in dictionaries should be interpreted in the context of the related technical writings rather than too ideally or impractically, unless the present disclosure expressly defines them so.

Although exemplary aspects of the present disclosure have been described for illustrative purposes, those skilled in the art will appreciate that various modifications, additions and substitutions are possible, without departing from the essential characteristics of the present invention. Therefore, exemplary aspects of the present invention have not been described for limiting purposes. Accordingly, the scope of the present invention is not to be limited by the above embodiments. It should be understood that the scope of the present invention is to be interpreted based on the following claims and all technical ideas in equivalent scopes belong to the scope of the present invention.

The invention claimed is:
1. A dual controller system comprising:
  a plurality of lower-layer circuits for performing respective functions;
  a clock signal-generating circuit for generating a clock signal according to a preset period,
  a first and a second controllers for transmitting identical control signals to control each of the plurality of lower-layer circuits according to the clock signal generated by the clock signal-generating circuit; and a relay circuit for relaying and blocking information between the first and second controllers and the plurality of lower-layer circuits, wherein both of the first and second controllers simultaneously operate in an active state and transmit the control signals to the relay circuit in the active state, wherein the first and second controllers transmit the control signals including identification information about the first and second controllers in each control signal, wherein each of the plurality of lower-layer circuits receives two control signals at a same clock signal through the relay circuit from both of the first and second controllers, inspects whether data included in the two control signals received from the first and second controllers is within or out of a preset reference range to check whether an error occurs in the two control signals, compares the two control signals to determine whether an error occurs in any one of the two control signals, and transmits a message indicating an occurrence of the error in one of the two control signals to the relay circuit when the error occurs in any one of the two control signals received from the relay circuit, wherein the relay circuit checks the message transmitted from each of the plurality of lower-layer circuits and checks the number of the lower-layer circuits each of which transmitted the message indicating that the error occurred in one of the two control signals, and then, when the number of the lower-layer circuits is equal to or greater than a preset reference number, the relay circuit determines that the error occurred in the first or second controller and blocks the control signal transmitted from the controller in which the error occurred, and wherein the lower-layer circuits are a plurality of sub-modules used in a High Voltage Direct Current (HVDC) system and the first and second controllers are sub-module controllers of the HVDC system.

2. The dual controller system of claim 1, wherein the first and second controllers transmit the control signals simultaneously or at a prescribed interval in an identical period of the clock signal.

3. The dual controller system of claim 1, wherein the first controller is a normal state controller and the second controller is an abnormal state controller, and wherein the normal state controller re-checks whether the error occurs through communication with the abnormal state controller, and when it is verified that the error has occurred, the dual controller system prevents power from being supplied to the abnormal state controller.

* * * * *